(12) United States Patent
Masuda et al.

(10) Patent No.: US 8,864,114 B2
(45) Date of Patent: *Oct. 21, 2014

(54) LIQUID-SEALED ANTIVIBRATION DEVICE

(75) Inventors: Tatsunori Masuda, Osaka (JP);
Kentaro Yamamoto, Osaka (JP);
Takahiro Ohguchi, Osaka (JP); Gen Isawa, Osaka (JP); Katsuhiro Sakurai, Aichi (JP)

(73) Assignees: Toyo Tire & Rubber Co., Ltd., Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 53 days.

This patent is subject to a terminal disclaimer.

(21) Appl. No.: 13/409,648

(22) Filed: Mar. 1, 2012

(65) Prior Publication Data

US 2012/0228813 A1    Sep. 13, 2012

(30) Foreign Application Priority Data

Mar. 11, 2011    (JP) .................................. 2011-054468

(51) Int. Cl.
*F16F 13/08*    (2006.01)
*F16F 13/10*    (2006.01)

(52) U.S. Cl.
CPC .................................. *F16F 13/106* (2013.01)
USPC .................................. 267/140.13; 267/140.2

(58) Field of Classification Search
USPC ............. 267/140.11, 140.13, 140.14, 140.15, 267/140.2, 141.4, 292
IPC .............................................. F16F 13/08,13/10
See application file for complete search history.

(56) References Cited

U.S. PATENT DOCUMENTS 4,787,611 A    11/1988    Sciortino
5,104,100 A *    4/1992    Simuttis ................... 267/140.13

(Continued)

FOREIGN PATENT DOCUMENTS

JP    64-049731 A    2/1989
JP    01-098722 A    4/1989

(Continued)

OTHER PUBLICATIONS

Office Action dated Jul. 5, 2013, issued in related U.S. Appl. No. 13/421,946 (16 pages).

(Continued)

*Primary Examiner* — Anna Momper
*Assistant Examiner* — San Aung
(74) *Attorney, Agent, or Firm* — Westerman, Hattori, Daniels & Adrian, LLP (57) ABSTRACT

A valve member formed of an elastomeric membrane for opening and closing a second orifice flow passage is mounted on a partition element such that the valve member is arranged orthogonal to the flow direction of the second orifice flow passage. A valve portion for closing openings of the second orifice flow passage due to flexural deformation of a flexible membrane portion caused by liquid flow in the second orifice flow passage is arranged on the flexible membrane, and communication holes for bring the second orifice flow passage into communication are formed in the flexible membrane portion. A cylindrical buffer portion projecting from the flexible membrane portion for surrounding the openings when the flexible membrane portion is deformed by flexure is provided to the valve portion, and a projection height of the cylindrical buffer portion is set larger than a wall thickness thereof.

8 Claims, 5 Drawing Sheets

(56) References Cited

U.S. PATENT DOCUMENTS

| | | | |
|---|---|---|---|
| 5,769,402 A | 6/1998 | Ide et al. | |
| 6,311,963 B1 | 11/2001 | Suzuki et al. | |
| 6,491,290 B2 * | 12/2002 | Muramatsu et al. | 267/140.14 |
| 6,523,816 B1 * | 2/2003 | Gastineau et al. | 267/140.14 |
| 7,328,888 B2 * | 2/2008 | Sakata | 267/140.13 |
| 7,464,918 B2 | 12/2008 | Hatakeyama et al. | |
| 2002/0043748 A1 | 4/2002 | Meyer | |
| 2002/0109280 A1 | 8/2002 | Baudendistel et al. | |
| 2006/0071381 A1 | 4/2006 | Hatakeyama et al. | |
| 2007/0085249 A1 | 4/2007 | Happou et al. | |
| 2008/0290573 A1 * | 11/2008 | Katayama et al. | 267/292 |
| 2009/0140477 A1 | 6/2009 | Michiyama | |
| 2011/0210488 A1 * | 9/2011 | Yamamoto et al. | 267/140.13 |
| 2012/0248669 A1 | 10/2012 | Masuda et al. | |

FOREIGN PATENT DOCUMENTS

| | | | |
|---|---|---|---|
| JP | 03121958 A * | 5/1991 | B60S 1/60 |
| JP | 2006-118547 A | 5/2006 | |
| JP | 2007-051713 A | 3/2007 | |
| JP | 2007-107712 A | 4/2007 | |
| JP | 2007-270866 A | 10/2007 | |
| JP | 2008-175321 A | 7/2008 | |
| JP | 2009-133453 A | 6/2009 | |
| JP | 2010-071452 A | 4/2010 | |
| JP | 2010-101466 A | 5/2010 | |
| JP | 2010-139023 A | 6/2010 | |
| WO | 2010-032344 A1 | 3/2010 | |
| WO | 2010-119595 A1 | 10/2010 | |

OTHER PUBLICATIONS

Chinese Office Action dated Dec. 4, 2013, issued in related Chinese Patent Application No. 201210089181.0 with partial translation (13 pages).

Chinese Office Action dated Dec. 4, 2013, issued in corresponding Chinese Patent Application No. 201210061740.7 with partial translation (11 pages).

Office Action dated Dec. 20, 2013, issued in related U.S. Appl. No. 13/421,946 (22 pages).

U.S. Notice of Allowance dated Apr. 14, 2014, issued in related U.S. Appl. No. 13/421,946 (18 pages).

Chinese Office Action dated Jul. 11, 2014, issued in corresponding Chinese Patent Application No. 201210061740.7 w/English translation (8 pages).

* cited by examiner

LIQUID-SEALED ANTIVIBRATION DEVICE

CROSS-REFERENCE TO RELATED APPLICATIONS

This application is based upon and claims the benefit of priority from the prior Japanese Patent Application No. 2011-54468, filed on Mar. 11, 2011; the entire contents of which are incorporated herein by reference.

BACKGROUND

1. Technical Field

The disclosure relates to a liquid-sealed antivibration device.

2. Related Art

As an antivibration device such as an engine mount which supports a vibration source such as an automobile engine while preventing the transmission of vibrations of the vibration source to a vehicle body side, there has been known a liquid-sealed antivibration device having the following constitution. That is, the liquid-sealed antivibration device includes: a first mounting member to be mounted on a vibration source side; a second mounting member to be mounted on a support side; an antivibration base body which is interposed between the first mounting member and the second mounting member and is made of an elastomer; a main liquid chamber where the antivibration base body forms a part of a chamber wall; a sub liquid chamber where a diaphragm forms a part of the chamber wall; and an orifice flow passage which allows the main liquid chamber and the sub liquid chamber to be communicated with each other. Due to a liquid flow effect brought about by the orifice flow passage and a vibration control effect of the antivibration base body, the liquid-sealed antivibration device performs a vibration damping function and a vibration insulating function (see JP-A-2006-118547 and JP-A-2010-139023, for example).

In this type of liquid-sealed antivibration device, to cope with vibrations having frequencies in a wide range, there has been known a liquid-sealed antivibration device where a plurality of orifice flow passages tuned to different frequencies are provided therein, and these orifice flow passages are switchable. Particularly, the applicant of this application has proposed the structure disclosed in the International Publication WO2010/032344A1, the entire contents of which are incorporated herein by reference, aiming at the changeover of the orifice flow passages with the inexpensive structure.

That is, WO2010/032344A1 discloses the constitution where a valve member formed of an elastomeric membrane for opening and closing a second orifice flow passage is mounted on a partition body, an outer peripheral portion of the valve member is fixed to the partition body, an opening of the second orifice flow passage is closed by flexural deformation of a flexible membrane portion on an inner side of the outer peripheral portion due to the flow of a fluid in the second orifice flow passage, and the second orifice flow passage is opened in a state where the flexible membrane portion is spaced apart from the opening due to a communication hole formed in the flexible membrane portion. Due to such a constitution, the second orifice flow passage is not closed by the valve member with an input of relatively small amplitude and hence, properties which make use of the second orifice flow passage on a high frequency side can be realized. On the other hand, with an input of relatively large amplitude, the flow of the liquid in the second orifice flow passage is increased so that the valve member is subjected to flexural deformation whereby the second orifice flow passage on a high frequency side is closed. Accordingly, a high damping performance by a first orifice flow passage on a low frequency side can be ensured. Further, due to the structure where the second orifice flow passage is closed by the flexural deformation of the valve member formed of the elastomeric membrane, when the flow of fluid becomes small, the second orifice flow passage can be returned to an open state due to a restoring force which the valve member possesses. Accordingly, a biasing means such as a spring, a switching chamber for a negative pressure or the like is unnecessary so that properties can be switched at a low cost.

However, in the constitution described above, when an input of large amplitude is generated as in the case of traveling on a rough road, there exists a possibility that an impact absorbing ability of the valve member becomes insufficient. That is, in the valve member, a valve portion which closes the opening of the second orifice flow passage by flexural deformation is formed in a flat membrane shape and hence, there is almost no space for the further deformation of the valve portion after the second orifice flow passage is closed when the input of large amplitude is generated. Accordingly, kinetic energy of the valve member is hardly absorbed after closing the second orifice flow passage so that a large load is transmitted to the partition body thus giving rise to a possibility that abnormal sound is generated.

To prevent such abnormal sound generated in the inside of the liquid chamber from being transmitted to the inside of a cabin, for example, JP-A-2006-118547 discloses the structure where a connection rubber elastic body is interposed between a partition element body into which a movable plate is incorporated and an orifice member mounted on an outer periphery of the partition element body. Also JP-A-2010-139023 discloses the structure where a cap member which forms an air chamber between the cap member and a diaphragm is divided into a first portion and a second portion, and a rubber elastic connection portion is interposed between the first portion and the second portion. However, in the structure where the connection portion formed of the rubber elastic body is interposed in the midst of a vibration transmission path, the connection portion is separately incorporated into the structure thus pushing up a manufacturing cost. Further, due to the presence of the elastic body, a liquid pressure loss occurs thus giving rise to a possibility that properties are influenced due to lowering of a damping performance.

SUMMARY

A liquid-sealed antivibration device according to an embodiment includes: a first mounting part to be mounted on one of a vibration source side and a support side; a second mounting part to be mounted on the other of the vibration source side and the support side; an antivibration base body formed of an elastomer interposed between the first mounting part and the second mounting part; a main liquid chamber whose chamber wall is partially formed of the antivibration base body and in which a liquid is sealed; at least one sub liquid chamber whose chamber wall is partially formed of a diaphragm formed of an elastomeric membrane and in which a liquid is sealed; a first orifice flow passage which connects the main liquid chamber with any one of the sub liquid chambers; a second orifice flow passage which is tuned to a frequency range higher than a frequency range of the first orifice flow passage and connects two liquid chambers out of the main liquid chamber and the sub liquid chambers; a partition element which partitions the main liquid chamber and any one of the sub liquid chambers and forms the second orifice flow passage therein; and a valve member formed of an elastomeric membrane for opening and closing the second orifice flow passage, and the valve member is held orthogonal to the flow direction of the second orifice flow passage in a valve housing chamber formed in the partition element. The valve member includes: an outer peripheral portion which is liquid-tightly held by the partition element; and a flexible membrane portion which is arranged inside the outer peripheral portion and on which a valve portion and a communication hole are formed. The valve portion is arranged to face in an opposed manner an opening of the second orifice flow passage leading to the valve housing chamber and is configured to close the opening due to flexural deformation of the flexible membrane portion caused by the flow of a liquid in the second orifice flow passage. The communication hole is formed at a position not being overlapped with the opening and is configured to bring the second orifice flow passage into communication. The valve portion includes a cylindrical buffer portion which projects from a membrane surface of the flexible membrane portion, is formed into a cylindrical shape for surrounding the opening in a state of flexural deformation of the flexible membrane, and has a projection height larger than a wall thickness thereof.

According to an embodiment, the projection height of the cylindrical buffer portion from the flexible membrane portion may be set larger than a wall thickness of the flexible membrane portion outside the cylindrical buffer portion. According to an embodiment, the cylindrical buffer portion may be formed in a projecting manner from both front and back membrane surfaces of the flexible membrane portion. According to an embodiment, a slit which extends in the height direction may be formed in the cylindrical buffer portion. According to an embodiment, a plurality of projections whose projection height is larger than the projection height of the cylindrical buffer portion may be formed on the flexible membrane portion outside the cylindrical buffer portion. In this case, the plurality of projections may be formed of plural kinds of projections which differ from each other in at least either one of the projection height and a cross-sectional area. According to an embodiment, a plurality of auxiliary projections may be formed on a distal end of the cylindrical buffer portion. According to an embodiment, a rib may be formed on a film portion inside the cylindrical buffer portion. These respective embodiments may be combined suitably.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
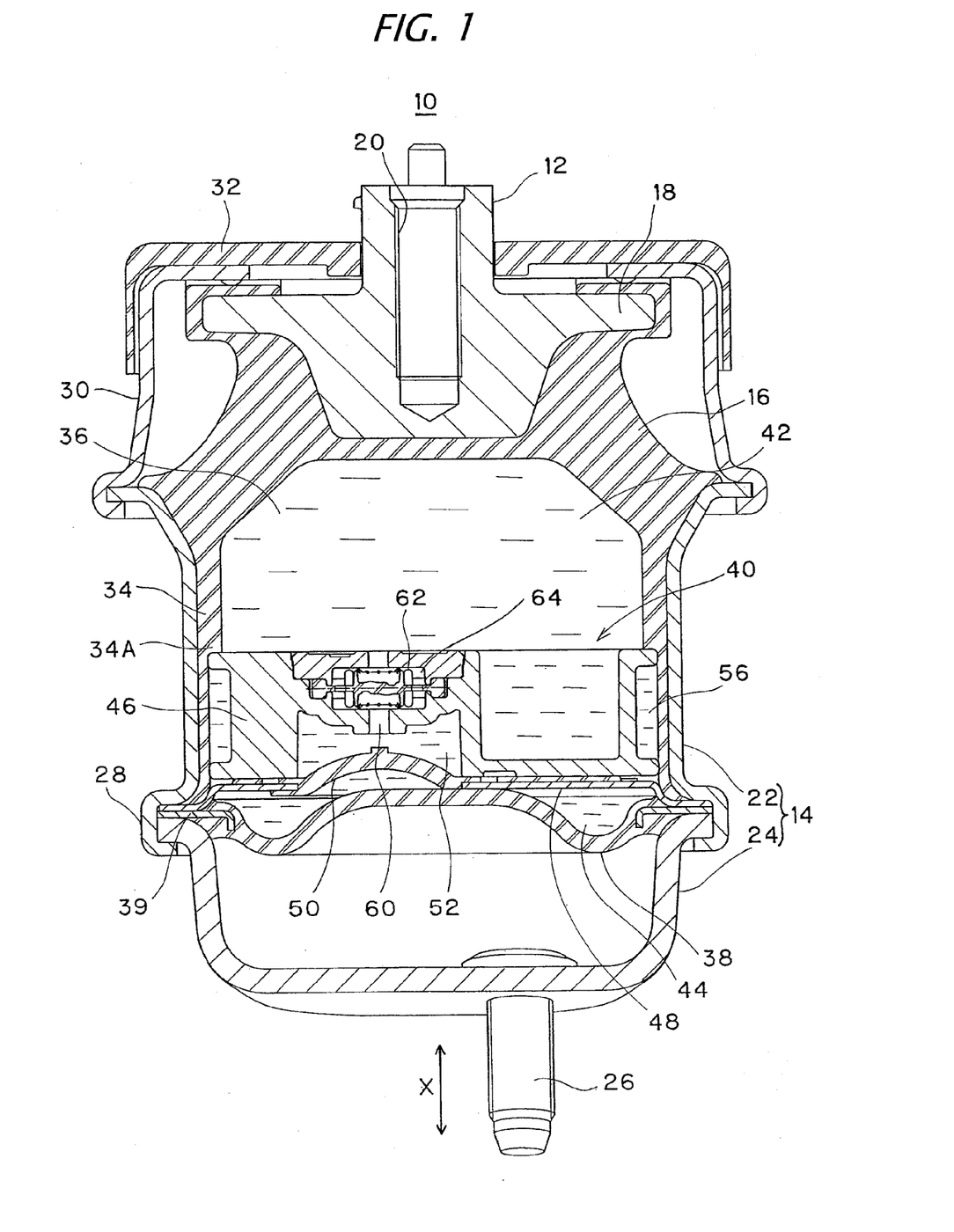
FIG. 1 is a longitudinal cross-sectional view of a liquid-sealed antivibration device according to an embodiment.

A liquid-sealed antivibration device 10 according to an embodiment shown in FIG. 1 is an engine mount which supports an engine of an automobile, and includes an upper-side first mounting part 12 which is mounted on an engine side which constitutes a vibration source, a lower-side second mounting part 14 having a cylindrical shape which is mounted on a vehicle body on a support side, and an antivibration base body 16 which is interposed between both mounting parts 12, 14 so as to connect both mounting parts 12, 14 to each other and is formed of a rubber elastic body. Here, FIG. 1 shows the liquid-sealed antivibration device 10 in an unloaded state.

The first mounting part 12 is a boss fitting arranged above the second mounting part 14 along an axis of the second mounting part 14, and a stopper portion 18 which projects radially outwardly in a flange shape is formed on the first mounting part 12. A bolt hole 20 is formed in an upper end portion of the first mounting part 12, and the first mounting part 12 is configured to be mounted on the engine side by means of a bolt not shown in the drawing.

The second mounting part 14 is constituted of a circular cylindrical fitting 22 on which the antivibration base body 16 is formed by vulcanization and a cup-shaped bottom fitting 24. A mounting bolt 26 extending downwardly is mounted on the bottom fitting 24 in a projecting manner, and the second mounting part 14 is configured to be mounted on the vehicle body side by means of the bolt 26. A lower end portion of the cylindrical fitting 22 is caulked and fixed to an upper end opening portion of the bottom fitting 24 by a caulking part 28. Symbol 30 indicates a stopper fitting which is caulked and fixed to an upper end portion of the cylindrical fitting 22, and exhibits a stopper action between the stopper part 18 of the first mounting part 12 and itself. Symbol 32 indicates a stopper rubber which covers an upper surface of the stopper fitting 30.

The antivibration base body 16 is formed into an approximately umbrella shape, wherein an upper end portion of the antivibration base body 16 is adhered to the first mounting part 12 by vulcanization and a lower end portion of the antivibration base body 16 is adhered to an upper end opening portion of the cylindrical fitting 22 by vulcanization respectively. A rubber-film-like seal wall portion 34 which covers an inner peripheral surface of the cylindrical fitting 22 is contiguously formed with the lower end portion of the antivibration base body 16.

A first diaphragm 38 which is formed of a flexible rubber membrane is mounted on the second mounting part 14 such that the first diaphragm 38 is arranged so as to face a lower surface of the antivibration base body 16 in an opposed manner in the axial direction X and forms a liquid-sealed chamber 36 between the first diaphragm 38 and the lower surface of the antivibration base body 16, and a liquid is sealed in the liquid-sealed chamber 36. The first diaphragm 38 includes an annular reinforcing fitting 39 on an outer peripheral portion thereof, and is fixed to the caulking portion 28 by means of the reinforcing fitting 39.

The above-mentioned liquid-sealed chamber 36 is partitioned into an upper-side main liquid chamber 42 whose chamber wall is partially formed of the antivibration base body 16 and a lower-side first sub liquid chamber 44 whose chamber wall is partially formed of the first diaphragm 38 by a partition element 40.

The partition element 40 is constituted of: a partition element body 46 which has a circular shape as viewed in a plan view, is fitted in the inside of the cylindrical fitting 22 by way of a seal wall portion 34 and is made of a rigid material such as metal or a resin; and a partition receiving plate 48 which is arranged in contact with a lower surface side of the partition element body 46. The partition receiving plate 48 is a disc-shaped fitting having a circular opening portion at an approximately center portion thereof, and a second diaphragm 50 which is formed of a flexible rubber membrane is integrally mounted on the opening portion by vulcanization. Further, by fixing the partition receiving plate 48 together with the reinforcing fitting 39 of the first diaphragm 38 by the caulking portion 28, the partition element body 46 is held in a state where the partition element body 46 is sandwiched between a stepped portion 34A formed on the seal wall portion 34 and the partition receiving plate 48 in the axial direction X.

Figure 2:
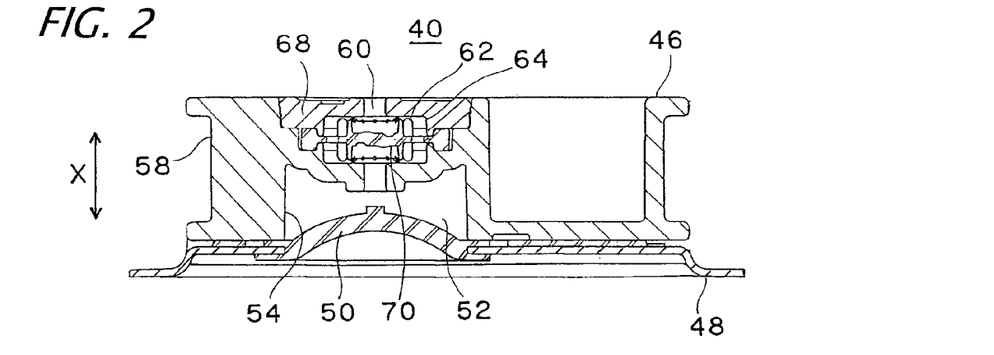
FIG. 2 is a longitudinal cross-sectional view of a partition element of the embodiment.

A second sub liquid chamber 52 which is partitioned from the first sub liquid chamber 44 by the second diaphragm 50 is formed on a first sub liquid chamber 44 side of the partition element 40. To be more specific, as shown in FIG. 2, a circular cavity 54 is formed on a lower surface of the partition element body 46, and by liquid-tightly closing the cavity 54 from below by the second diaphragm 50, the second sub liquid chamber 52 which has a circular shape as viewed in a plan view and whose chamber wall is partially formed of the second diaphragm 50 is formed.

The above-mentioned main liquid chamber 42 and first sub liquid chamber 44 are communicated with each other through a first orifice flow passage 56 which is a throttle flow passage. In this example, the first orifice flow passage 56 is a low-frequency-side orifice which is tuned to a low frequency range (for example, approximately 5 to 15 Hz) corresponding to shaking vibrations so as to damp shaking vibrations at the time of traveling of a vehicle. That is, the tuning is performed by adjusting a cross-sectional area and a length of a flow passage such that a damping effect based on a resonance action of a liquid which flows through the first orifice flow passage 56 can be effectively acquired when shaking vibrations are inputted.

The first orifice flow passage 56 is formed on an outer peripheral side of the partition element 40. To be more specific, the first orifice flow passage 56 which extends in the circumferential direction is formed between a first orifice forming groove 58 which is formed on the outer peripheral portion of the partition element body 46 and is opened outwardly and the above-mentioned seal wall portion 34. The first orifice flow passage 56 includes a main-liquid-chamber-side opening (not shown in the drawing) which opens toward the main liquid chamber 42 on one end thereof in the circumferential direction, and also includes a sub-liquid-chamber-side opening (not shown in the drawing) which opens toward the first sub liquid chamber 44 on the other end thereof in the circumferential direction.

The above-mentioned main liquid chamber 42 and the second sub liquid chamber 52 are communicated with each other through a second orifice flow passage 60 which is a throttle flow passage. The second orifice flow passage 60 is a high-frequency-side orifice which is tuned to a frequency range higher than the frequency range to which the first orifice flow passage 56 is tuned. In this embodiment, the second orifice flow passage 60 is tuned to a high frequency range (for example, approximately 15 to 50 Hz) corresponding to idling vibrations for reducing idling vibrations at the time of idling of a vehicle (vehicle stopping state). That is, the tuning is performed by adjusting a cross-sectional area and a length of a flow passage such that a low dynamic spring effect based on a resonance action of a liquid which flows through the second orifice flow passage 60 can be effectively acquired when idling vibrations are inputted.

The second orifice flow passage 60 is formed on an inner peripheral side of the partition element 40 and, in this example, extends in the thickness direction (in this example, in the same direction as the above-mentioned axial direction X) of the partition element 40. To be more specific, as shown in FIG. 2, the second orifice flow passage 60 is formed such that the second orifice flow passage 60 penetrates the partition element body 46 in the axial direction X at a position on a more inner peripheral side than the first orifice forming groove 58 and reaches the cavity 54. Accordingly, an upper end of the second orifice flow passage 60 opens in the main liquid chamber 42, and a lower end of the second orifice flow passage 60 opens in the second sub liquid chamber 52.

Figure 3:
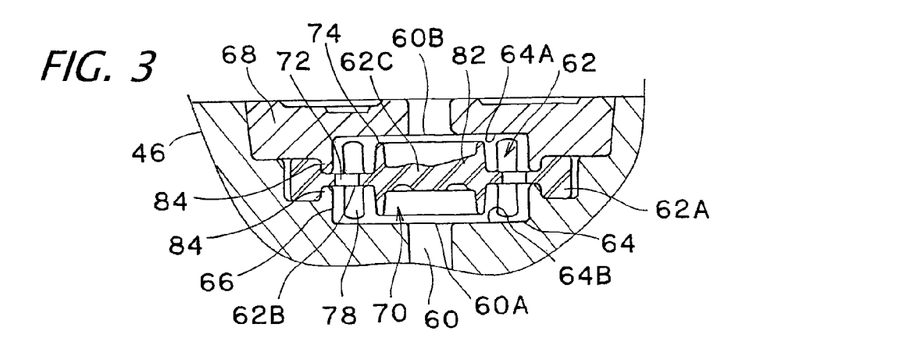
FIG. 3 is an enlarged cross-sectional view of a part of the partition element.

The antivibration device 10 includes a disc-shaped (circular-membrane-shaped) valve member 62 which opens and closes the second orifice flow passage 60 and is formed of a rubber elastic body. In the partition element 40, a valve housing chamber 64 is formed in a portion of the second orifice flow passage 60, and the valve member 62 is housed and held in the valve housing chamber 64 orthogonal to the flow direction of the second orifice flow passage 60. As shown in FIG. 1 to FIG. 3, the valve member 62 is arranged in a middle portion of the second orifice flow passage 60 in a posture where membrane surfaces of the valve member 62 are arranged orthogonal to the axial direction X which is the flow direction of the second orifice flow passage 60.

To be more specific, as shown in FIG. 3, a stepped recessed portion 66 having a circular shape as viewed in a plan view is formed on an upper surface of the partition element body 46, and a disc-shaped lid member 68 which is made of a rigid material such as metal or a resin is fitted in and fixed to an opening side of the stepped recessed portion 66 thus forming a space between the stepped recessed portion 66 and the lid member 68. This space constitutes the above-mentioned valve housing chamber 64. A circular-shaped opening 60A of the second orifice flow passage 60 is formed in a center portion of the stepped recessed portion 66, and a circular-shaped opening 60B having the same diameter as the opening 60A is also formed in a center portion of the lid member 68 which faces the opening 60A in an opposed manner in the axial direction X, and these openings 60A, 60B constitute opening of the second orifice flow passage 60 leading to the valve housing chamber 64.

Figure 4:
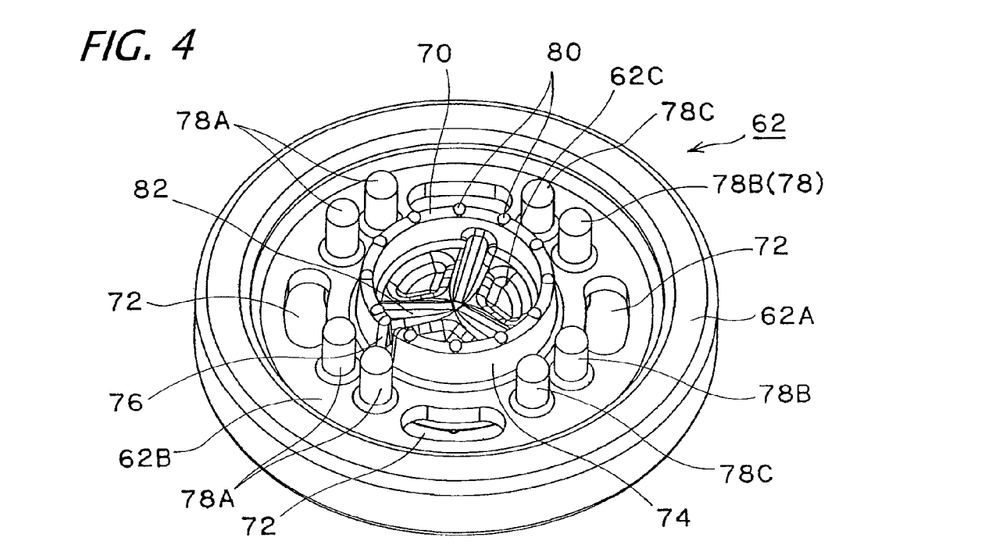
FIG. 4 is a perspective view of a valve member of the embodiment.

By fitting the valve member 62 in the stepped recessed portion 66 and by fixing the above-mentioned lid member 68 to the stepped recessed portion 66, the valve member 62 is held in the inside of the valve housing chamber 64 in a state where an outer peripheral portion 62A of the valve member 62 is sandwiched between upper and lower wall surfaces 64A, 64B of the valve housing chamber 64 (that is, a lower surface of the lid member 68 and a bottom surface of the stepped recessed portion 66) liquid-tightly (that is, in such a manner that a liquid is not leaked). As shown in FIG. 4, The valve member 62 has the outer peripheral portion 62A which has a large wall thickness over the whole circumference, and also has a flexible membrane portion 62B formed of a small wall thickness membrane inside the outer peripheral portion 62A having a large wall thickness. The flexible membrane film portion 62B is formed at an intermediate position of the large-thickness outer peripheral portion 62A in the thickness direction (axial direction X) so as to close a space defined within an inner peripheral surface of the outer peripheral portion 62A.

The flexible membrane portion 62B is configured to be deformed by flexure (elastically deformed) in the axial direction X from a neutral position shown in FIG. 3 due to the flow of a liquid in the second orifice flow passage 60. A valve portion 70 which closes the above-mentioned openings 60A, 60B due to the flexural deformation of the flexible membrane portion 62B is arranged on a center portion of the flexible membrane portion 62B which faces the upper and lower openings 60A, 60B of the second orifice flow passage 60 in an opposed manner. A plurality of communication holes 72 which is configured to bring the second orifice flow passage 60 into communication are formed in the flexible membrane portion 62B at positions where the communication holes 72 do not overlap the above-mentioned openings 60A, 60B, that is, at positions where the communication holes 72 do not overlap the openings 60A, 60B as viewed in the axial direction X. As shown in FIG. 5, the communication holes 72 are arranged in a spaced-apart manner at a plurality of positions on the circumference surrounding the valve portion 70. In this example, four communication holes 72 are formed in the flexible membrane portion 62B equidistantly. The communication holes 72 are configured such that, in a state where the valve portion 70 is separated from the above-mentioned openings 60A, 60B so that the respective openings 60A, 60B are opened (see FIG. 3), a liquid flows in the second orifice flow passage 60 through the communication holes 72 thus opening the second orifice flow passage 60. A total area of the communication holes 72 is set larger than a cross-sectional area of the second orifice flow passage 60, that is, an area of each opening 60A, 60B for preventing the communication holes 72 from performing a throttle effect.

Figure 8:
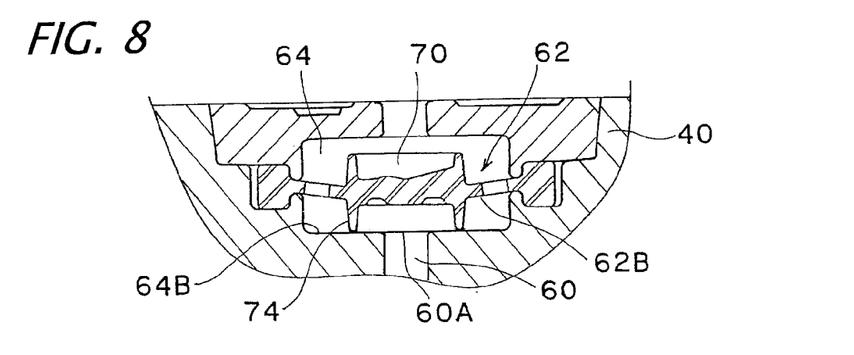
FIG. 8 is an enlarged cross-sectional view of a part of the partition element when vibrations in the compression direction of a main liquid chamber are inputted.
Figure 9:
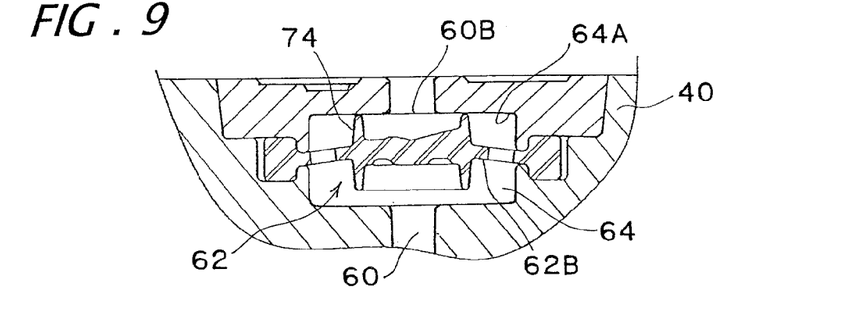
FIG. 9 is an enlarged cross-sectional view of the part of the partition element when vibrations in the tensile direction of the main liquid chamber are inputted.

The valve portion 70 includes a cylindrical buffer portion 74 which projects from a membrane surface of the flexible membrane portion 62B. In this example, the cylindrical buffer portion 74 is formed in a projecting manner from both front and back membrane surfaces of the flexible membrane portion 62B respectively. The cylindrical buffer portion 74 is formed of a cylindrical rubber portion which is brought into contact with the periphery of these openings 60A, 60B of the second orifice flow passage 60 and surrounds the openings 60A, 60B so as to close the openings 60A, 60B when the flexible membrane portion 62B is subjected to flexural deformation. The cylindrical buffer portion 74 is configured so as to buffer an impact caused by contact of the valve portion 70 with the partition element 40 and is also configured to buffer energy transmitted to the partition element 40 by allowing the deformation of the valve portion 70 also after the second orifice flow passage 60 is closed. That is, the cylindrical buffer portion 74 is formed with a small wall thickness and a large height (see FIG. 7) such that a projection height (a projection height from the flexible membrane portion 62B) Q is larger than a wall thickness P (P<Q). Accordingly, as shown in FIG. 8 and FIG. 9, even after the second orifice flow passage 60 is closed, the valve portion 70 (that is, the cylindrical buffer portion 74) can be easily deformed in the axial direction X. The projection height Q of the cylindrical buffer portion 74 is more preferably set larger than a wall thickness R of the flexible membrane portion 62B arranged outside the cylindrical buffer portion 74 (Q>R), and the wall thickness P of the cylindrical buffer portion 74 is set to satisfy the relationship of P<0.5 Q with respect to the projection height Q. As one example, in this embodiment, the projection height Q is set to 2.5 and the wall thickness P is set to 0.6 assuming the thickness R as 1 (for example, 1 mm).

As shown in FIG. 4 and FIG. 5, a slit 76 which extends in the height direction (in the same direction as the axial direction X) of the cylindrical buffer portion 74 is formed in the cylindrical buffer portion 74. The slit 76 is a narrow cut (gap) for allowing the slight flowing back and forth of the liquid even after the second orifice flow passage 60 is closed. The slit 76 is formed on one portion of the cylindrical buffer portion 74 in the circumferential direction. Although not particularly limited, a width of the slit 76 is preferably set substantially equal to the thickness P of the cylindrical buffer portion 74, and a depth of the slit 76 (a size in the axial direction X) is preferably set substantially equal to the projection height Q of the cylindrical buffer portion 74. That is, the slit 76 is preferably formed so as to extend over the whole cylindrical buffer portion 74 in the height direction. In this example, one small-width slit 76 is formed in each of upper and lower cylindrical buffer portions 74, 74, and both slits 76 are formed at the same position in the circumferential direction.

Figures 5A, 5B:
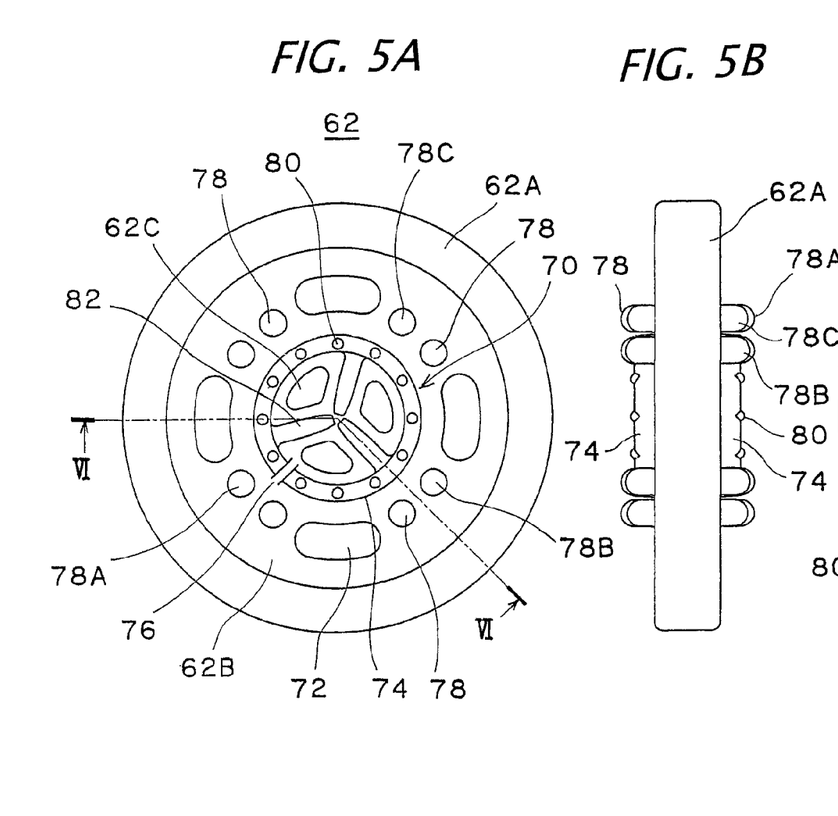
FIG. 5A is a plan view of the valve member.
FIG. 5B is a side view of the valve member.
Figure 5C:
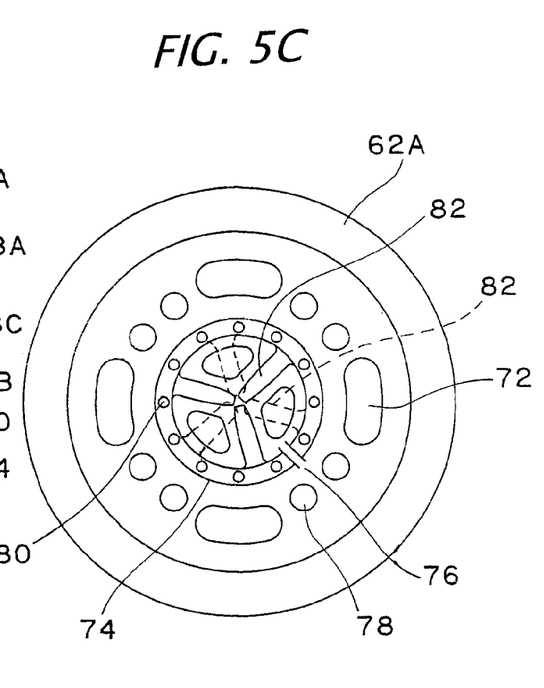
FIG. 5C is a bottom plan view of the valve member.
Figures 6, 7:
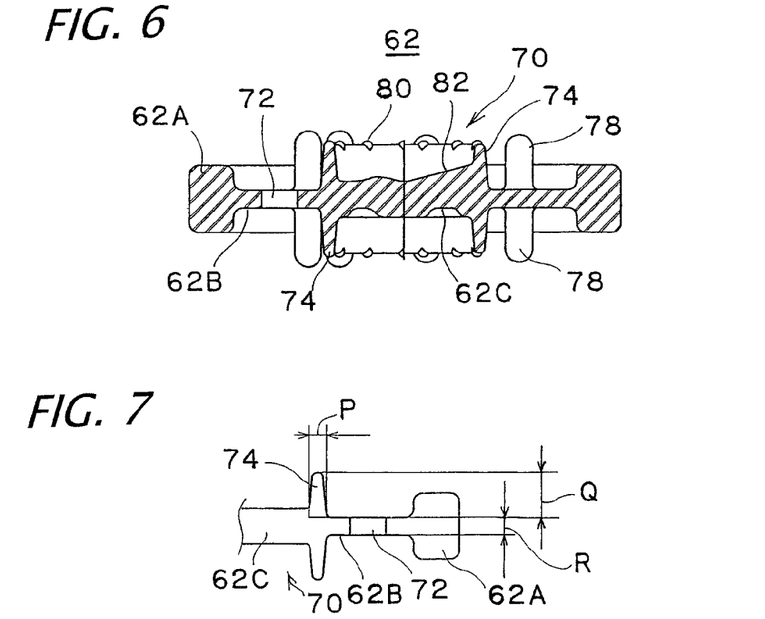
FIG. 6 is a cross-sectional view taken along a line VI-VI in FIG. 5A.
FIG. 7 is an enlarged cross-sectional view of a part of the valve member.

As shown in FIG. 4 to FIG. 6, a plurality of columnar projections 78 whose projection height is larger than a projection height of the cylindrical buffer portion 74 are formed on the flexible membrane portion 62B outside the cylindrical buffer portion 74. The projections 78 are formed on the membrane surfaces of the flexible membrane portion 62B at positions where the projections 78 do not overlap the above-mentioned openings 60A, 60B. As shown in FIG. 5, two projections 78 are formed between the neighboring communication holes 72 on the circumference surrounding the cylindrical buffer portion 74 (in this example, on the same circumference as the circumference on which the above-mentioned communication holes 72 are arranged). As shown in FIG. 5A and FIG. 5C, the projections 78 are formed on both upper and lower membrane surfaces of the flexible membrane portion 62B in a projecting manner, and are formed in symmetry in the vertical direction. In this example, the projections 78 are formed such that distal ends of the projections 78 are not brought into contact with the wall surfaces 64A, 64B of the valve housing chamber 64 when the valve member 62 is at the neutral position. However, the projections 78 may be formed such that the distal ends of the projections 78 are brought into contact with the wall surfaces 64A, 64B of the valve housing chamber 64 when the valve member 62 is at the neutral position.

In this example, the plurality of projections 78 are constituted of three kinds of projections which differ from each other in projection height. To be more specific, the plurality of projections 78 are constituted of four first projections 78A having the largest projection height, two third projections 78C having the smallest projection height, and two second projections 78B having the intermediate projection height between the largest height and the smallest height.

A plurality of auxiliary projections 80 are formed on a distal end of the cylindrical buffer portion 74. The auxiliary projections 80 are minute semispherical projections and are arranged in a spaced-apart manner on the distal end portion of the cylindrical buffer portion 74 equidistantly in the circumferential direction. As shown in FIG. 5B, a height of the auxiliary projection 80 is set smaller than the height of the above-mentioned projection 78 (particularly, the lowest third projection 78C). The auxiliary projections 80 are formed on the upper and lower cylindrical buffer portions 74, 74 respectively.

Further, ribs 82 for reinforcing the cylindrical buffer portion 74 each of which is formed of a projecting ridge are formed on a membrane portion 62C inside the cylindrical buffer portion 74. The plurality (three in this example) of ribs 82 extend radially from the center (identical to the center of the valve portion 70) of the valve member 62, and are connected to an inner peripheral surface of the cylindrical buffer portion 74. As shown in FIG. 6, an upper surface of the rib 82 is formed in an inclined manner such that the height of the upper surface of the rib 82 is gradually increased radially outwardly from the center thus reinforcing a base portion of the cylindrical buffer portion 74. As shown in FIG. 5, the ribs 82 are mounted on the upper and lower cylindrical buffer portions 74, 74 respectively, and are arranged such that the upper ribs 82 and the lower ribs 82 are displaced from each other in phase (see FIG. 5C).

As shown in FIG. 3, a ring-shaped restriction projection 84 which is brought into contact with the inner peripheral surface of the outer peripheral portion 62A of the valve member 62 having a large thickness and restricts the displacement of the outer peripheral portion 62A in the radially inward direction is mounted on the upper and lower wall surfaces 64A, 64B of the valve housing chamber 64.

According to the liquid-sealed antivibration device 10 of this embodiment having the above-mentioned constitution, when vibrations of relatively minute amplitude on a high frequency side are inputted to the liquid-sealed antivibration device 10 as in the case of idling where a vehicle is stopped, the flow of liquid in the second orifice flow passage 60 is small and hence, the flexible membrane portion 62B of the valve member 62 is hardly subjected to flexural deformation. Accordingly, as shown in FIG. 3, the valve portion 70 does not close the second orifice flow passage 60, and a liquid in the second orifice flow passage 60 can flow back and forth between the main liquid chamber 42 and the second sub liquid chamber 52 through the communication holes 72 formed in the valve member 62. Accordingly, due to a resonance action of a liquid which flows through the second orifice flow passage 60 on a high frequency side, the excellent antivibration effect can be acquired against idling vibrations.

On the other hand, when vibrations of relatively large amplitude on a low frequency side are inputted to the liquid-sealed antivibration device 10 as in the case of shaking vibrations at the time of traveling of a vehicle, the flow of the liquid in the second orifice flow passage 60 becomes large and hence, the flexible membrane portion 62B of the valve member 62 is pressed in the flow direction X due to the flow of liquid whereby the flexible membrane portion 62B is subjected to flexural deformation. Accordingly, when vibrations are inputted to the liquid-sealed antivibration device 10 in the direction that a liquid in the main liquid chamber 42 is compressed as shown in FIG. 8, for example, the valve portion 70 closes the lower opening 60A whereby the second orifice flow passage 60 is closed by the valve member 62, while when vibrations are inputted to the liquid-sealed antivibration device 10 in the direction that the liquid in the main liquid chamber 42 is pulled as shown in FIG. 9, the valve portion 70 closes the upper opening 60B whereby the second orifice flow passage 60 is closed by the valve member 62. Accordingly, a liquid flows back and forth between the main liquid chamber 42 and the first sub liquid chamber 44 through the first orifice flow passage 56 on a low frequency side. Accordingly, due to a resonance action of a liquid which flows through the first orifice flow passage 56, the high damping performance can be acquired against shaking vibrations.

As described above, the liquid-sealed antivibration device 10 has the structure where the second orifice flow passage 60 is closed due to the flexural deformation of the valve member 62 formed of a rubber elastic membrane and hence, when the flow of a liquid toward the valve member 62 becomes small, it is possible to return the second orifice flow passage 60 to an opened state by a restoring force which the valve member 62 possesses. Accordingly, even when a biasing means such as a spring is not additionally provided, the characteristics acquired by two orifice flow passages 56, 60 can be switched and hence, it is possible to provide a switching-type liquid-sealed antivibration device having the compact structure at a low cost.

Particularly, according to this embodiment, the cylindrical buffer portion 74 formed of a small-thickness rubber wall is formed on the valve portion 70 as described above. Accordingly, even after the second orifice flow passage 60 is closed as shown in FIG. 8 or FIG. 9, the cylindrical buffer portion 74 is elastically deformed and hence, the deformation of the valve portion 70 is allowed. Accordingly, for example, when vibrations of large amplitude are inputted at the time of traveling on a rough road or the like, the valve portion 70 is deformed even after the second orifice flow passage 60 is closed. Accordingly, the transmission of energy to the partition element 40 (that is, the wall surfaces 64A, 64B of the valve housing chamber 64) can be damped. That is, in this case, assuming kinetic energy of the valve member 62 which is deformed by flexure due to the flow of the liquid as E1 and assuming energy consumed by the deformation of the valve portion 70 as E2, energy E transmitted to the partition element 40 is expressed by a formula $E=E1-E2$. Accordingly, the energy transmitted to the partition element 40 can be reduced by an amount of energy consumed by the deformation of the valve portion 70 so that the generation of abnormal sound can be suppressed.

Accordingly, in the liquid-sealed antivibration device of the embodiment 10, the cylindrical buffer portion 74 is formed on the valve portion 70 of the valve member 62 for opening and closing the second orifice flow passage 60 as described above and hence, abnormal sound which is generated after closing the second orifice flow passage 60 when vibrations of large amplitude are inputted at the time of traveling on a rough road or the like can be reduced.

Further, by forming the above-mentioned cylindrical buffer portion 74 on the valve portion 70, a change in load brought about by the contact of the valve portion 70 with the partition element 40 becomes smooth thus reducing an impact caused by the contact. Particularly, in this embodiment, the projections 78 and the auxiliary projections 80 are formed as described above and hence, when the valve member 62 is subjected to flexural deformation, the valve portion 70 is brought into contact with the partition element 40 (that is, the wall surfaces 64A, 64B of the valve housing chamber 64) in order from the first projections 78A, the second projections 78B, the third projections 78C, the auxiliary projections 80 and the body of the cylindrical buffer portion 74. By bringing the valve portion 70 into contact with the partition element 40 in stages in this manner, a change in load brought about by the contact of the valve portion 70 with the partition element 40 can be made smooth.

Further, by forming the slit 76 having a small width in the cylindrical buffer portion 74 in the above-mentioned manner, also after the second orifice flow passage 60 is closed, a slight amount of flow of liquid is allowed. Accordingly, it is possible to avoid a drawback that the valve portion 70 adheres to the periphery of the above-mentioned opening 60A, 60B of the partition element 40 by suction so that the valve portion 70 cannot return to the neutral position.

Further, by forming the reinforcing ribs 82 inside the cylindrical buffer portion 74, the suppression of the collapse of the cylindrical buffer portion 74 caused by the repeated deformation can be largely improved. Further, using such ribs 82 which reinforce the base portion of the cylindrical buffer portion 74, a change in rigidity of the cylindrical buffer portion 74 caused by the ribs 82 is small as a whole and hence, it is possible to suppress the ribs 82 from influencing the abnormal sound performance.

Figure 10:
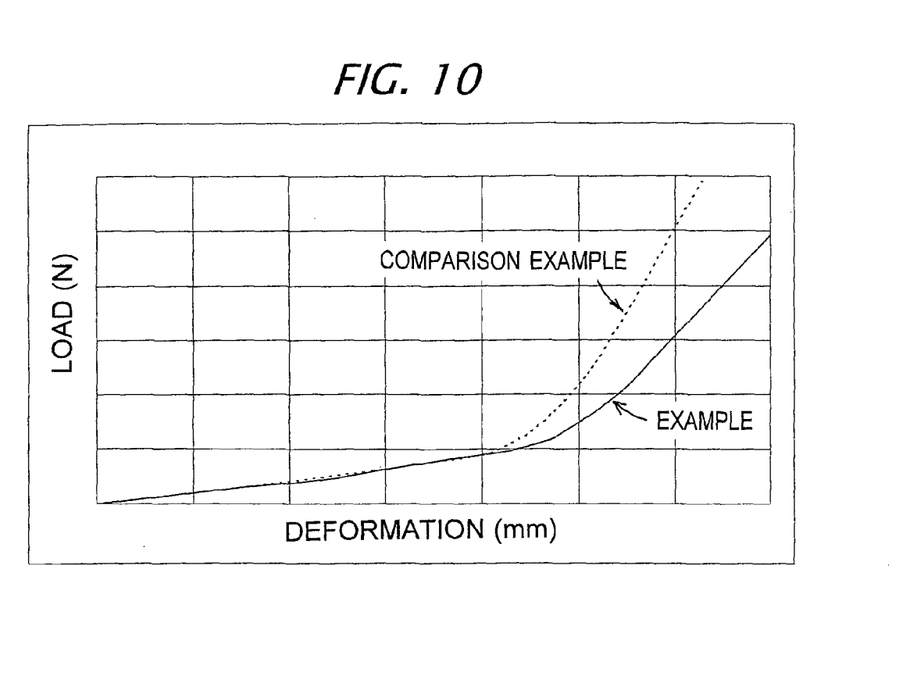
FIG. 10 is a graph showing the relationship between the displacement of a valve portion in the axial direction and a load.

FIG. 10 is a graph showing the relationship between the displacement of the valve portion in the axial direction and a load with respect to the liquid-sealed antivibration device which includes the valve portion 70 provided with the cylindrical buffer portion 74 according to this embodiment (Example) and a liquid-sealed antivibration device which includes a flat valve portion as disclosed in WO2010/032344A1 (Comparison Example). That is, by assuming the flow of a liquid in the second orifice flow passage 60, the relationship between a load and flexure (displacement) when a center portion of the valve portion (the membrane portion 62C arranged inside the cylindrical buffer portion 74 in the Example) is pushed by a spherical body in the axial direction X thus pushing the valve portion to the wall surface 64B of the valve housing chamber 64 is investigated. As a result, as shown in FIG. 10, the rise of a load is steep after the valve portion is brought into contact with the partition element (wall surface) in the Comparison Example, while a change in load after the valve portion is brought into contact with the partition element is smooth in the Example.

Figure 11:
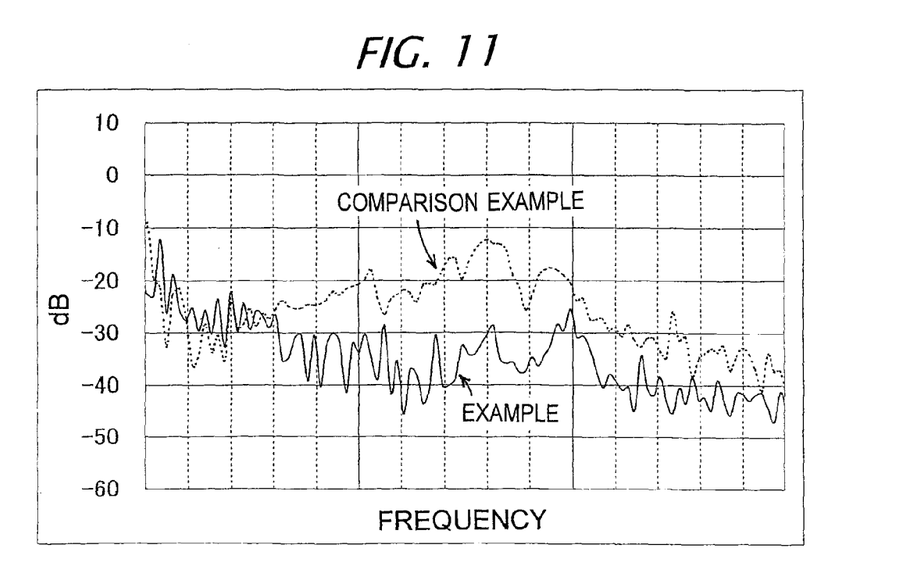
FIG. 11 is a graph showing the relationship between frequency and a dynamic load of the antivibration device.

When the abnormal sound characteristic (the relationship between frequency and a dynamic load) are investigated with respect to the liquid-sealed antivibration device of the Example and the liquid-sealed antivibration device of the Comparison Example, as shown in FIG. 11, when vibrations of amplitude ±0.5 mm are inputted to the respective devices, a dynamic load is largely reduced so that abnormal sound is largely reduced in the liquid-sealed antivibration device of the Example compared to the liquid-sealed antivibration device of the Comparison Example.

Although the projection heights of the projections 78 are changed in forming the plural kinds of projections 78 on the flexible membrane portion 62B of the valve member 62 in the above-mentioned embodiment, cross-sectional areas of the projections 78 may be changed by changing diameters of the projections 78 or the like. The plural kinds of projections 78 may be formed by also changing both the projection heights and the cross-sectional areas of the projections 78. Further, although the projections 78 are formed in three levels, that is, the first projections 78A, the second projections 78B and the third projections 78C in the above-mentioned embodiment, provided that the projection height or the cross-sectional area of the projections are set in two or more levels, the number of levels is not particularly limited to three levels.

Further, in the above-mentioned embodiment, the second sub liquid chamber 52 is formed, and the second orifice flow passage 60 is formed so as to allow the main liquid chamber 42 and the second sub liquid chamber 52 to communicate with each other. However, the present invention is also applicable to a case where only the first sub liquid chamber 44 is provided as the sub liquid chamber and, in the same manner as the first orifice flow passage 56, the second orifice flow passage 60 is formed so as to allow the main liquid chamber 42 and the first sub liquid chamber 44 to communicate with each other. Further, in the above-mentioned embodiment, the second sub liquid chamber 52 is formed on the first sub liquid chamber 44 side of the partition element 40, and the second orifice flow passage 60 is formed so as to allow the main liquid chamber 42 and the second sub liquid chamber 52 to communicate with each other. However, in place of this constitution, in a state where the second sub liquid chamber is formed on a main liquid chamber side of the partition element and the second sub liquid chamber is partitioned from the main liquid chamber by a second diaphragm, the second orifice flow passage may be formed so as to allow the second sub liquid chamber and the first sub liquid chamber to communicate with each other. As described above, provided that the flow passage allows the different liquid chambers to communicate with each other, for example, the second orifice flow passage may be a flow passage which allows the main liquid chamber and any one of sub liquid chambers to communicate with each other, or may be a flow passage which allows two sub liquid chambers to communicate with each other.

As the preferred constitution, the sub liquid chambers are constituted of the first sub liquid chamber whose chamber wall is partially formed of the first diaphragm mounted on the second mounting part and the second sub liquid chamber whose chamber wall is partially formed of the second diaphragm mounted on the partition element, and the partition element partitions the main liquid chamber and the first sub liquid chamber, the first orifice flow passage is formed so as to allow the main liquid chamber and the first sub liquid chamber to communicate with each other, and the second orifice flow passage is formed so as to allow the second sub liquid chamber and the main liquid chamber or the first sub liquid chamber to communicate with each other. More preferably, as in the case of the above-mentioned embodiment, the second sub liquid chamber which is partitioned from the first sub liquid chamber by the second diaphragm is formed on the first sub liquid chamber side of the partition element, the first orifice flow passage is formed so as to allow the main liquid chamber and the first sub liquid chamber to communicate with each other, and the second orifice flow passage is formed so as to allow the main liquid chamber and the second sub liquid chamber to communicate with each other.

Although an object to be damped is shaking vibrations or idling vibrations in the above-mentioned embodiment, the object to be damped is not limited to these vibrations, and the present invention is also applicable to various kinds of vibrations which differ from each other in frequency. Further, although not enumerated in detail, various modifications are conceivable.

The disclosure is applicable to various kinds of antivibration devices such as a body mount and a differential gear mount in addition to the engine mount, for example.

What is claimed is:
1. A liquid-sealed antivibration device comprising:
a first mounting part to be mounted on one of a vibration source side and a support side;
a second mounting part to be mounted on the other of the vibration source side and the support side;
an antivibration base body formed of an elastomer interposed between the first mounting part and the second mounting part;
a main liquid chamber whose chamber wall is partially formed of the antivibration base body and in which a liquid is sealed;
at least one sub liquid chamber in which a liquid is sealed, each of the at least one sub liquid chamber comprising a chamber wall which is formed of a diaphragm comprising an elastomeric membrane;

a first orifice flow passage which connects the main liquid chamber with any one of the at least one sub liquid chamber;

a second orifice flow passage which is tuned to a frequency range higher than a frequency range of the first orifice flow passage and connects two liquid chambers out of the main liquid chamber and the at least one sub liquid chamber;

a partition element which partitions the main liquid chamber and any one of the at least one sub liquid chamber and forms the second orifice flow passage therein; and a valve member formed of an elastomeric membrane for opening and closing the second orifice flow passage, the valve member being held orthogonal to the flow direction of the second orifice flow passage in a valve housing chamber formed in the partition element;

wherein the valve member comprises:
an outer peripheral portion which is liquid-tightly held by the partition element; and
a flexible membrane portion which is arranged inside the outer peripheral portion and on which a valve portion and a communication hole are formed, the valve portion is arranged to face in an opposed manner an opening of the second orifice flow passage leading to the valve housing chamber and is configured to close the opening due to flexural deformation of the flexible membrane portion caused by the flow of a liquid in the second orifice flow passage, the communication hole is formed at a position not being overlapped with the opening and is configured to bring the second orifice flow passage into communication, the valve portion comprises a cylindrical buffer portion which projects from a membrane surface of the flexible membrane portion, and is formed into a cylindrical shape for surrounding the opening in a state of flexural deformation of the flexible membrane portion, the projection height of the cylindrical buffer portion from the flexible membrane portion is set larger than a wall thickness of the cylindrical buffer portion, and is set larger than a wall thickness of the flexible membrane portion outside the cylindrical buffer portion, and a plurality of auxiliary projections are formed on a distal end of the cylindrical buffer portion.

2. The liquid-sealed antivibration device according to claim 1,
wherein the cylindrical buffer portion is formed in a projecting manner from both front and back membrane surfaces of the flexible membrane portion.

3. The liquid-sealed antivibration device according to claim 1, wherein a slit which extends in the height direction is formed in the cylindrical buffer portion.

4. The liquid-sealed antivibration device according to claim 1,
wherein a plurality of projections whose projection height is larger than the projection height of the cylindrical buffer portion are formed on the flexible membrane portion outside the cylindrical buffer portion.

5. The liquid-sealed antivibration device according to claim 4,
wherein the plurality of projections comprise a first projection and a second projection which differs from the first projection in projection height and/or cross-sectional area.

6. The liquid-sealed antivibration device according to claim 1,
wherein a rib is formed on a membrane portion inside the cylindrical buffer portion.

7. The liquid-sealed antivibration device according to claim 1,
wherein the at least one sub liquid chamber comprise a first sub liquid chamber whose chamber wall is partially formed of a first diaphragm mounted on the second mounting part, and a second sub liquid chamber whose chamber wall is partially formed of a second diaphragm mounted on the partition element,
the partition element partitions the main liquid chamber and the first sub liquid chamber,
the first orifice flow passage is formed so as to allow the main liquid chamber and the first sub liquid chamber to communicate with each other, and
the second orifice flow passage is formed so as to allow the second sub liquid chamber and the main liquid chamber or the first sub liquid chamber to communicate with each other.

8. The liquid-sealed antivibration device according to claim 7,
wherein the second sub liquid chamber which is partitioned from the first sub liquid chamber by the second diaphragm is formed on the first sub liquid chamber side of the partition element,
the first orifice flow passage is formed so as to allow the main liquid chamber and the first sub liquid chamber to communicate with each other, and
the second orifice flow passage is formed so as to allow the main liquid chamber and the second sub liquid chamber to communicate with each other.

* * * * *